United States Patent Office 3,479,134
Patented Nov. 18, 1969

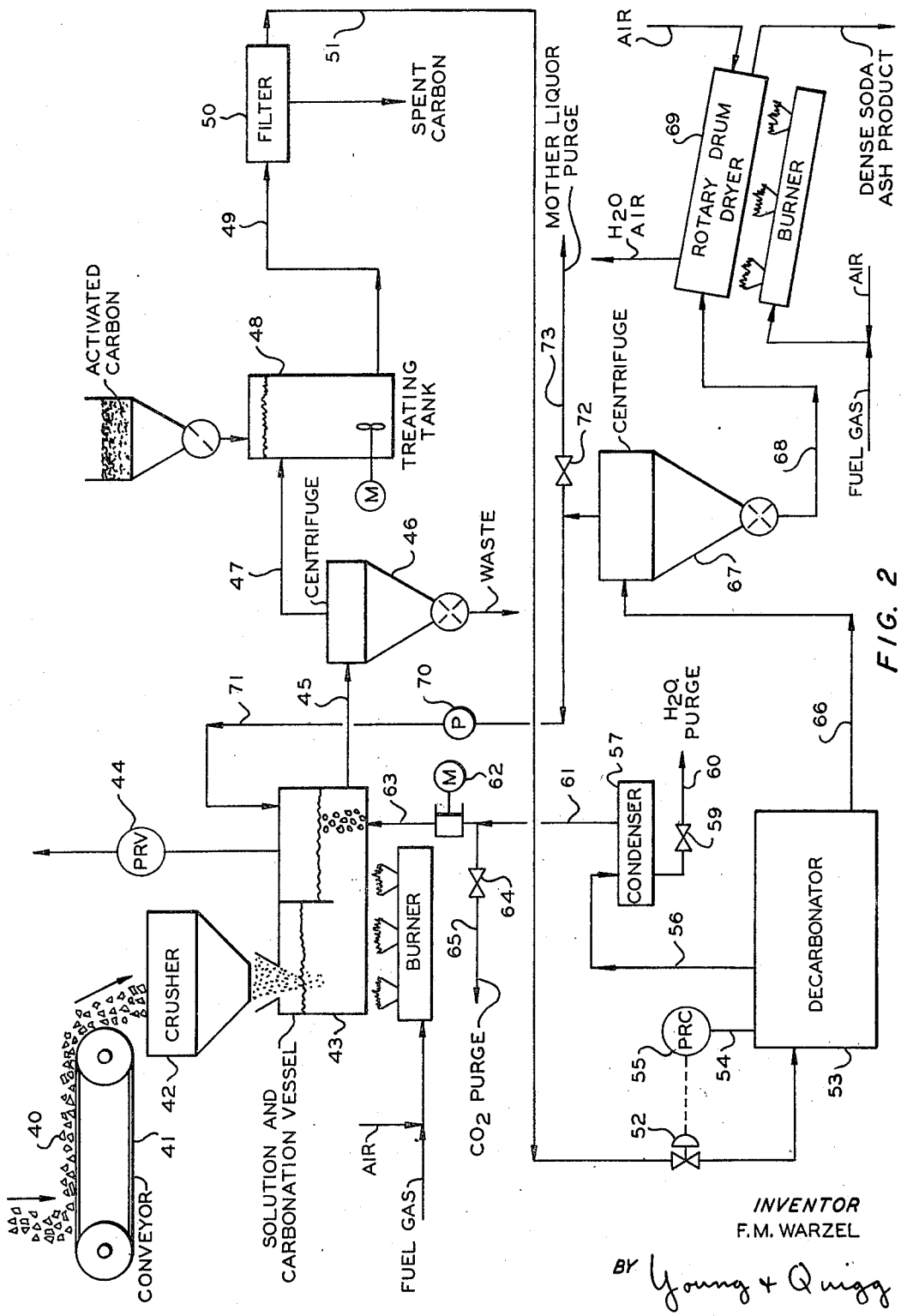

3,479,134
PRODUCTION OF DENSE SODA ASH
FROM TRONA
Fred M. Warzel, Bartlesville, Okla., assignor to Phillips
Petroleum Company, a corporation of Delaware
Filed Jan. 19, 1967, Ser. No. 610,409
Int. Cl. C01d 7/12
U.S. Cl. 23—63                          22 Claims

ABSTRACT OF THE DISCLOSURE

A process for producing soda ash having a density in excess of 80 pounds per cubic foot by the following steps and sequence: crushing and screening the trona ore; dissolving the crushed trona in water and liquid recycled from a point downstream in the process under elevated pressures and temperatures, carbon dioxide is added simultaneously during this dissolving step to increase the concentration of dissolved sodium bicarbonate in solution; removing insolubles, such as shale, from the resulting solution; removing carbon dioxide from the solution by reducing system pressure so that anhydrous sodium carbonate crystals precipitate; separating the crystals from the liquid; and drying the crystals to remove remaining water and produce the soda ash product. In one embodiment the crushed ore is calcined prior to dissolving to preclude the otherwise necessary step of removing organic materials from the solution by contacting same with an adsorbent material, such as activated carbon.

This invention relates to the production of dense soda ash. In another aspect, this invention relates to a process for producing dense crystalline anhydrous soda ash from natural, dry-mined trona.

There is a considerable demand by industry for soda ash of high density. The glass and steel industry, consumers of large quantities of soda ash, desire soda ash of high density because furnace yield is a function of the density of ingredients employed in the charge; therefore, maximum density soda ash results in maximum yields. Transportation costs of high density soda ash are less because of the capability for transporting larger tonnage per volume capacity.

Nearly all the commercially avialable soda ash is manufactured by two basic processes, an ammonia-soda processes and a natural trona process. The natural trona process for producing soda ash produces a high quality, dense product at relatively low cost and is offering increased competition to the ammonia-soda process. An increase in the density of soda ash produced from natural trona will further enhance its competitive position in the market. Because of the relatively remote location and limited modes of transportation to the trona fields near Green River, Wyoming, transportation costs are an important economic consideration for potential users of soda users of soda ash produced from natural trona. High density, high quality soda ash produced from natural trona results in transportation costs being overridden by the less expensive process costs associated with the natural trona process.

The most widely used methods of producing dense soda ash (approximately 60 lbs. per cubic foot) from natural trona includes a series of steps involving: sizing the trona, calcining the crude trona, dissolving the calcined trona in water, evaporating a portion of water from the solution to crystallize sodium carbonate monohydrate from the solution, and calcining the sodium carbonate monohydrate from the solution, and calcining the sodium carbonate monohydrate to convert same to soda ash (sodium carbonate) by driving off the water frome the hydrated crystals. A disadvantage of this type process is that the crystals are not uniform in size and shape because of cavities resulting from the liberation of water during calcination.

Other methods which calcine sodium sesquicarbonate as the final step of the process produce soda ash, which although of high purity, is of low bulk density (approximately 50 to 55 pounds per cubic foot) and consists largely of acicular crystals.

Accordingly, an object of this invention is to provide a process for producing high density soda ash from natural, dry-mined trona.

Another object of this invention is to provide a process for producing high density, high purity soda ash by forming anhydrous sodium carbonate from natural, dry-mined trona.

Further objects, advantages and features of this invention will become apparent to those skilled in the art from the following detailed discussion.

FIGURE 2 is a diagrammtaic flow sheet illustrating another embodiment of the process for the production of anhydrous sodium carbonate in which the crude trona is not calcined prior to dissolution.

Figure 1:
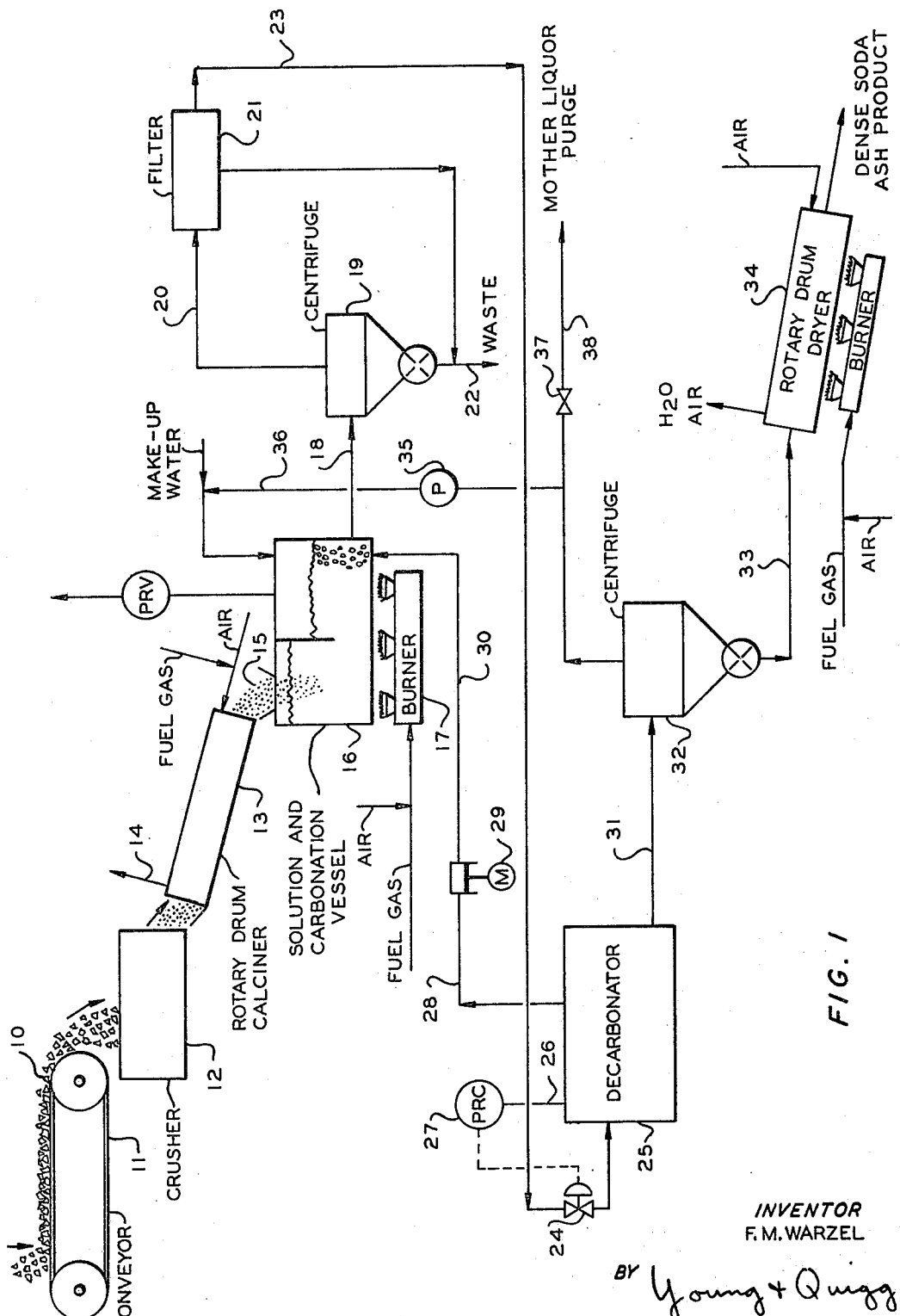
FIGURE 1 is a diagrammatic flow sheet illustrating one embodiment of the process for the production of anhydrous sodium carbonate from calcined trona.

Broadly stated, one embodiment of the process of this invention comprises crushing the crude trona ore, calcining the crushed trona to remove organic materials, dissolving the calcined trona with the recycled mother liquor at relatively high temperature and pressure, and simultaneously carbonating the solution to increase the concentration of dissolved sodium bicarbonate therein, removing insolubles from the solution while maintaining the solution under relatively high temperature and pressure, decarbonating the solution thereby precipitating anhydrous sodium carbonate crystals, separating the precipitated anhydrous sodium carbonate crystals, recycling the mother liquor to the solution and carbonation step and drying the anhydrous sodium carbonate crystals to produce a high purity, high density soda ash product. The bulk density of soda ash produced by this process will be in excess of 80 pounds per cubic foot.

Throughout this specification reference is made to solutions containing sodium carbonate, sodium bicarbonate and trona. As is well known by those skilled in the art, these materials are crystalline and, strictly speaking, do not exist as such in solution. For the sake of brevity and clarity, and to be consistent with accepted terminology in the art, I speak of solutions of sodium carbonate, etc., as though these materials did exist in solution.

In one embodiment of the process of this invention the crude trona is calcined before being dissolved. Crude trona solutions contain organics which discolor the soda ash product if not removed, so treatment with an agent to remove these organic materials is required. Solutions of dissolved calcined trona do not require this treatment since organic materials in the crude trona are burned off during calcination.

In addition to burning off the organic materials, calcination of crude trona (represented chemically as $Na_2CO_3 \cdot NaHCO_3 \cdot 2H_2O$) converts the sodium bicarbonate present therein to sodium carbonate, drives off the water of crystallization, thereby producing a crude anhydrous sodium carbonate. The calcined trona is dissolved in recycled mother liquor and make-up water at elevated temperature and pressure to produce a solution of sodium carbonate and sodium bicarbonate containing a relatively high concentration of sodium bicarbonate. The carbon dioxide necessary for the carbonation can be obtained by recycling the gases evolving from the decarbonation step. Make-up carbon dioxide can be recovered from the trona calcination step.

The dissolution can be conducted at temperatures as low as about 150° C. A higher temperature is advantageous because a greater concentration of sodium bicarbonate can be achieved. Because of the reduced solubility of sodium carbonate in mother liquor at temperatures above 150° C., it is also advantageous to carry out the decarbonation step at higher temperatures. Accordingly, a temperature of about 200° C. is preferred for both the dissolution and decarbonation or crystal production steps. Temperatures up to 250° C. can be used; however, the increased production of crystals tends to be overridden by the increased cost of the heating requirements to obtain these higher solution temperatures. Performing the dissolution and decarbonating steps at about the same temperature has the added advantage of reducing the heating and cooling requirements for the process.

The pressure in the solution and carbonation vessel is determined by the temperature to which the solution is heated and the amount of carbon dioxide added; i.e., the solution temperature and composition. The pressure increases with an increase in either the temperature or amount of carbon dioxide added. The preferred temperature is about 200° C. which, combined with the preferred composition, results in a pressure of about 350 to 450 p.s.i.a.

After the dissolution of the trona in mother liquor, at elevated temperatures and under pressure, insolubles are removed from the solution and it is then passed to a decarbonator where carbon dioxide is removed and anhydrous sodium carbonate crystals precipitate. The pressure of the decarbonation vessel is maintained at about 200 to 300 p.s.i.a. in order to remove the proper amount of carbon dioxide.

From the decarbonation and crystallization step the anhydrous sodium carbonate crystals and mother liquor are passed to a centrifuge where the crystals are separated from the mother liquor. The mother liquor is recycled to the solution and carbonation step for dissolution of additional trona, and make-up water is added as needed. Crude trona contains varying amounts of NaCl and $Na_2SO_4$. As the concentrations of NaCl and $Na_2SO_4$ build up in the recycling liquor, complex salts may crystallize out with the anhydrous sodium carbonate. Purging the system by bleeding some of the recycling mother liquor to waste can be used as a means for limiting NaCl and $Na_2SO_4$ at an acceptable concentration level.

The separated anhydrous sodium carbonate crystals are passed to a dryer and maintained at a temperature above 115° C. while removing remaining water to form a high density soda ash product. The system between the centrifuge and the dryer is maintained at a pressure above 25 p.s.i.a. to prevent the crystals from cooling below 115° C. and hydrating to sodium carbonate monohydrate before being dried.

One mode of operation for carrying out this invention is illustrated diagrammatically by FIGURE 1. The crude trona 10 is transferred by conveyor 11 to a crusher 12, wherein the crude trona is crushed and passed through a 4 to 20 mesh screen. Proper sizing of the trona pellets is important in order to obtain maximum surface area exposure, and to ensure that oxygen diffuses into the ore pellets and oxidizes the non-volatile materials; hence, adequate decomposition of organics. The crushed trona is then passed to a calciner 13, preferably fuel gas fired. In the calciner the crude trona is heated to about 510 to 630° C. thereby converting the trona to sodium carbonate and burning off organic materials present therein. Products of combustion from the calciner 13 as well as the gaseous products of reaction are exhausted via line 14.

The calcined trona 15 is then passed to a solution and carbonation vessel 16 where the sodium carbonate and other solubles are dissolved in the mother liquor recycled via line 36. The solution is heated to about 200° C. by a gas burner 17 and the pressure is maintained at about 400 p.s.i.a. Carbon dioxide is added to the solution and carbonation vessel 16 via line 30. A pressure relief valve can be used to ensure that the design capability of the system equipment is not exceeded during the carbonation step.

The solution of sodium carbonate, sodium bicarbonate, other solubles and suspended insolubles is passed to a centrifuge 19, via line 18, with the temperature maintained at about 200° C. and the pressure at about 400 p.s.i.a., where most of the suspended insolubles, primarily shale, are separated. The solution is then passed to a filter 21 via line 20 to remove any remaining insolubles. The filtered insolubles and residue from the centrifuge are discarded to waste via line 22.

The solution from the filter 21 is passed via line 23 through valve 24 to a decarbonator 25 wherein dissolved sodium bicarbonate decomposes and anhydrous sodium carbonate crystals are formed. The decarbonation vessel is maintained at a pressure of about 250 p.s.i.a. and a temperature of about 200° C. The pressure in the decarbonator can be controlled by any conventional means. For purposes of illustration, a pressure recorder-controller 27 which senses the decarbonation vessel pressure via line 26 and controls the position of valve 24, which in turn controls the flow of the high pressure solution to the decarbonation vessel, is shown.

The gases which evolve during conversion of dissolved sodium bicarbonate to crystalline sodium carbonate, primarily carbon dioxide and water, are routed via line 28 to compressor 29. The compressor is required to raise the gas pressure from about 250 p.s.i.a., the decarbonation vessel pressure, to about 400 p.s.i.a., the solution and carbonation vessel pressure. From the compressor 29 the evolved gases are introduced into the solution and carbonation vessel 16 via line 30. If required, make-up carbon dioxide may be recovered from the trona calciner exhaust gases, passing through conduit 14, by any conventional means.

The precipitated anhydrous sodium carbonate crystals and mother liquor are passed to centrifuge 32 via line 31 where the crystals are separated from the mother liquor. The separated anhydrous sodium carbonate crystals are passed from centrifuge 32 to dryer 34 via line 33 where any remaining water is removed to form a high purity, high density soda ash product. As discussed previously, the pressure in line 33 and dryer 34 is maintained above 25 p.s.i.a. to ensure that the wet crystals do not hydrate to sodium carbonate monohydrate before becoming dried.

The mother liquor from centrifuge 32 is recycled by pump 35 via line 36 to the solution and carbonation vessel 16 for dissolution of more calcined trona. To limit the concentration of NaCl and $Na_2SO_4$ at an acceptable level some of the mother liquor is bled to waste by valve 37 via line 38. Make-up water can be added to the dissolution step, in order to maintain a material balance, as shown in FIGURE 1.

Heat is supplied to the cycle to maintain the system temperature throughout the dissolution, carbonation, insolubles removal, decarbonation and crystal separation steps at as close to a constant temperature as is practical within equipment limitations. This results in predictable crystalline size and shape and predictable crystal yield rates.

A somewhat modified type of process similar to the process in FIGURE 1 is illustrated diagrammatically by FIGURE 2. In this embodiment the crude trona ore is dissolved without calcination. The crude trona ore 40 is transferred by conveyor 41 to crusher 42 wherein the trona is crushed and passed through a 4 to 10 mesh screen to a solution and carbonation vessel 43 where the crude trona is dissolved in mother liquor recycled via line 71.

Since the trona is not calcined, the ganule size of the crushed crude trona ore is not quite so important as in the previously discussed embodiment. A small granule size is desirable to obtain a reasonable dissolution rate of the crude trona. The system temperature and pressure, like the embodiment illustrated by FIGURE 1, is maintained at about 200° C. and about 400 p.s.i.a. so the granular size of the ore does not have to be as small as that required for calcination to obtain a reasonable dissolution rate. For this reason 4 to 10 mesh screen size is acceptable.

Carbon dioxide is added to the solution and carbonation vessel 43 via line 63. Since the sodium bicarbonate in the crude trona has not been converted to sodium carbonate by calcination, less carbon dioxide is required in this embodiment. A pressure relief valve 44 can be used to ensure that the design capability of the equipment is not exceeded during the carbonation step.

The carbonated solution of crude trona, other solubles and suspended insolubles is passed to a centrifuge 46 via line 45 where the suspended insolubles are separated and discarded to waste.

As discussed previously, crude trona solutions contain organic contamination which cause a yellowish discoloration of the soda ash product if not removed. These organic materials can be removed from the solution by contacting it with an adsorbent material, such as activated carbon. The trona solution is passed from the centrifuge 46 via line 47 to an agitated treating tank 48 where the solution is placed in agitated contact with activated carbon. The solution, from which the organic materials have been removed, is passed from the treating tank 48 via line 49 through a filter 50 to remove any carbon contained therein. The spent adsorbent removed from filter 50 may be discarded or revived for reuse.

The solution is then passed from filter 50 via line 51 though valve 52 to decarbonator 53 wherein the dissolved sodium bicarbonate decomposes and anhydrous sodium carbonate crystals are formed. The carbonator is operated at similar temperatures and pressures described for the process illustrated by FIG. 1. As previously illustrated in FIG. 1, the pressure of the decarbonator can be controlled by a pressure recorder-controller 55 which senses the decarbonator pressure via line 54 and controls the position of valve 52 which in turn controls the flow of high pressure pregnant liquor to the decarbonator 53.

The gases which evolve during decomposition of sodium bicarbonate to sodium carbonate, primarily carbon dioxide and water, are recycled to the solution and carbonation vessel. Without the calcination step to drive off carbon dioxide and water, crude trona solutions contain considerably larger quantities of these constituents; therefore, it is necessary to remove the excess quantities. The evolved gases are passed from the decarbonator 53 via line 56 to condenser 57 where the water vapor is liquefied.

To maintain a material balance in the system, excess water is purged by valve 59 via line 60. Carbon dioxide is passed from condenser 57 via line 61 to compressor 62 where the gas pressure is raised to that of the solution and carbonation vessel, about 400 p.s.i.a., and is then introduced into solution and carbonation vessel 43 via line 63. The excess carbon dioxide is purged from the system by valve 64 via line 65.

The precipitated anhydrous sodium carbonate crystals and mother liquor are passed from decarbonator 53 to centrifuge 67 via line 66 where the crystals are separated from the mother liquor. The separated anhydrous sodium carbonate crystals are passed from centrifuge 67 to dryer 69, via line 68, where any remaining water is removed to form a high purity, high density soda ash product. As discussed previously, the pressure in line 68 and dryer 69 is maintained above 25 p.s.i.a. to ensure that the wet crystals do not hydrate to sodium carbonate monohydrate before becoming dried.

The motor liquor from centrifuge 67 is recycled by pump 70 through line 71 to solution and carbonation vessel 43 for dissolution of more crude trona. To limit the concentration of NaCl and $Na_2SO_4$ at an acceptable level some of the mother liquor is bled to waste by valve 72 via line 73.

EXAMPLE

For a plant producing dense soda ash at a rate of 350,000 tons per year according to the embodiment of this invention illustrated and described in connection with FIGURE 2, the following conditions will apply:

Crushed and screened crude trona ore to solution and carbonation vessel 43, lbs./hour:

| | | |
|---|---:|---:|
| $Na_2CO_3$ | 56,400 | |
| $NaHCO_3$ | 44,700 | |
| $H_2O$ | 19,100 | |
| Insolubles (primarily shale) | 11,355 | |
| NaCl | 106 | |
| $Na_2SO_4$ | 45 | |
| Organics | 475 | |
| | 132,181 | 132,181 |

Mother liquor from centrifuge 67 passed to solution and carbonation vessel 43 via line 71, lbs./hour:

| | | |
|---|---:|---:|
| $Na_2CO_3$ | 206,450 | |
| $H_2O$ | 679,610 | |
| NaCl | 4,400 | |
| $Na_2SO_4$ | 1,800 | |
| | 892,260 | 892,260 |
| Carbon dioxide added to solution and carbonation vessel 43 via line 63, lbs./hour | | 65,500 |

Effluent from solution and carbonation vessel 43 via line 45, lbs./hour:

| | | |
|---|---:|---:|
| $Na_2CO_3$ | 104,850 | |
| $NaHCO_3$ | 294,850 | |
| $H_2O$ | 670,060 | |
| Insolubles (primarily shale) | 11,355 | |
| NaCl | 4,506 | |
| $Na_2SO_4$ | 1,845 | |
| Organics | 475 | |
| | 1,087,941 | 1,087,941 |
| Centrifuge 46 waste, lbs./hour | | 11,355 |

Solution to treating tank 48 via line 47, lbs./hour:

| | | |
|---|---:|---:|
| $Na_2CO_3$ | 104,850 | |
| $NaHCO_3$ | 294,850 | |
| $H_2O$ | 670,060 | |
| Insolubles (primarily shale) | 0 | |
| NaCl | 4,506 | |
| $Na_2SO_4$ | 1,845 | |
| Organics | 475 | |
| | 1,076,586 | 1,076,586 |

Filtrate to decarbonator 53 via line 51, lbs./hour:

| | | |
|---|---:|---:|
| Na$_2$CO$_3$ | 104,850 | |
| NaHCO$_3$ | 294,850 | |
| H$_2$O | 670,060 | |
| NaCl | 4,506 | |
| Na$_2$SO$_4$ | 1,845 | |
| Organics | 0 | |
| | 1,076,111 | 1,076,111 |

Decomposition gases vented from decarbonator 53 via line 56, lbs./hour:

| | | |
|---|---:|---:|
| H$_2$O | 31,650 | |
| CO$_2$ | 77,200 | |
| | 108,850 | 108,850 |

Carbon dioxide from condenser 57 via line 61, lbs./hour _____ 77,200
Carbon dioxide purge via line 65, lbs./hour __ 11,700
Water purge via line 60, lbs./hour _____ 31,650

Effluent from decarbonator 53 to centrifuge 67 via line 66, lbs./hour:

| | | |
|---|---:|---:|
| Na$_2$CO$_3$ | 290,850 | |
| NaHCO$_3$ | 0 | |
| H$_2$O | 701,710 | |
| NaCl | 4,506 | |
| Na$_2$SO$_4$ | 1,845 | |
| | 998,911 | 998,911 |

Anhydrous sodium carbonate crystals from centrifuge 67 to dryer 69 via line 68, lbs./hour:

| | | |
|---|---:|---:|
| Na$_2$CO$_3$ | 77,560 | |
| H$_2$O | 15,000 | |
| | 92,560 | 92,560 |

Mother liquor purge to waste via line 73, lbs./hour:

| | | |
|---|---:|---:|
| Na$_2$CO$_3$ | 6,840 | |
| H$_2$O | 16,400 | |
| NaCl | 106 | |
| Na$_2$SO$_4$ | 45 | |
| | 23,391 | 23,391 |

Dense soda ash product in excess of 80 lbs. per cubic foot, lbs./hour _____ 77,560

Various modifications and alterations will become apparent to those skilled in the art without departing from the scope and spirit of this invention, and it should be understood that the latter is not necessarily limited to the aforementioned discussion.

I claim:

1. A process for producing substantially organic-free, high density soda ash from crude trona comprising crushing the crude trona, calcining the crushed crude trona to remove organic materials therefrom, dissolving the calcined trona in recycled liquid while carbonating with carbon dioxide under elevated pressure and temperature, removing insolubles from the resulting solution, decarbonating the solution by reducing the said pressure and thereby precipitating anhydrous sodium carbonate crystals therefrom, separating the precipitated anhydrous sodium carbonate crystals from the liquid, recycling the said liquid to the solution and carbonation step, and drying the anhydrous sodium carbonate crystals.

2. A process of claim 1 wherein the pressure during the dissolution and carbonation step is from about 350 to about 450 p.s.i.a.

3. The process of claim 1 wherein the temperature during the dissolution and carbonation step is from about 150 to about 250° C.

4. The process of claim 1 wherein carbon dioxide is recovered from at least one of the calcining and decarbonating steps and recycled to the dissolution and carbonation step.

5. The process of claim 1 wherein the dissolution and carbonation step is performed at a pressure of about 350 to 450 p.s.i.a. and at a temperature of about 150 to 250° C.

6. The process of claim 5 wherein the decarbonation step is performed at a pressure of about 200 to 300 p.s.i.a. and at a temperature of about 150 to 250° C.

7. The process of claim 6 wherein the pressure during dissolution and carbonation is 400 p.s.i.a.

8. The process of claim 7 wherein the temperature during dissolution and carbonation is 200° C.

9. The process of claim 8 wherein the pressure during decarbonation is 250 p.s.i.a.

10. The process of claim 9 wherein the temperature during decarbonation is 200° C.

11. A process for producing substantially organic-free, high density soda ash from crude trona comprising crushing the crude trona, dissolving the crushed crude trona in recycled liquid while carbonating with carbon dioxide under elevated pressure and temperature, removing insolubles from the resulting solution, removing organic materials which remain in the solution after removal of insolubles by contacting same with an adsorbent, removing the adsorbent from the solution, decarbonating the solution by reducing the said pressure and thereby precipitating anhydrous sodium carbonate crystals therefrom, separating the precipitated anhydrous sodium carbonate crystals from the liquid, recycling the said liquid to the solution and carbonation step, and drying the anhydrous sodium carbonate crystals.

12. The process of claim 11 wherein the pressure during the dissolution and carbonation step is from about 350 to about 450 p.s.i.a.

13. The process of claim 11 wherein the temperature during the dissolution and carbonation step is from about 150 to about 250° C.

14. The process of claim 11 including recovering carbon dioxide from the decarbonating step and recycling said carbon dioxide to the dissolution and carbonation step.

15. The process of claim 11 wherein the dissolution and carbonation step is performed at a pressure of about 350 to 450 p.s.i.a. and at a temperature of about 150 to 250° C., and said adsorbent is activated carbon.

16. The process of claim 15 wherein the decarbonation step is performed at a pressure of about 200 to about 300 p.s.i.a. and at a temperature of about 150 to 250° C.

17. The process of claim 16 wherein the pressure during dissolution and carbonation is 400 p.s.i.a.

18. The process of claim 17 wherein the temperature during dissolution and carbonation is 200° C.

19. The process of claim 18 wherein the pressure during decarbonation is 250 p.s.i.a.

20. The process of claim 19 wherein the temperature during decarbonation is 200° C.

21. A process for producing substantially organic-free, high density soda ash from crude trona comprising crushing the crude trona, calcining the crushed crude trona to remove organic materials therefrom, dissolving the calcined trona in recycled liquid while carbonating with carbon dioxide under a pressure of from about 350 to 450 p.s.i.a. and temperature of from about 150 to about 250° C., removing insolubles from the resulting solution, decarbonating the solution by reducing the said pressure to about 200 to about 300 p.s.i.a. and thereby precipitating anhydrous sodium carbonate crystals therefrom, separating the precipitated anhydrous sodium carbonate crystals from the liquid, recycling the said liquid to the solution and carbonation step, and drying the anhydrous sodium carbonate crystals.

22. A process for producing substantially organic-free, high density soda ash from crude trona comprising crushing the crude trona, dissolving the crushed crude trona in recycled liquid while carbonating with carbon dioxide at a pressure of from about 350 to about 450 p.s.i.a. and at a temperature of from about 150 to about 250° C., removing insolubles from the resulting solution, removing organic materials which remain in the solution after removal of insolubles by contacting said solution with an adsorbent, removing the adsorbent from the solution, decarbonating the solution by reducing the said pressure to about 200 to about 300 p.s.i.a. and thereby precipitating anhydrous sodium carbonate crystals therefrom, separating the precipitated anhydrous sodium carbonate crystals from the liquid, recycling the said liquid to the solution and carbonation step, and drying the anhydrous sodium carbonate crystals.

References Cited
UNITED STATES PATENTS

| | | | |
|---|---|---|---|
| 1,907,987 | 5/1933 | Lynn | 23—63 |
| 2,770,524 | 11/1956 | Seaton et al. | 23—63 |
| 3,264,057 | 8/1966 | Miller | 23—63 |

OSCAR R. VERTIZ, Primary Examiner

G. T. OZAKI, Assistant Examiner

U.S. Cl. X.R.

23—64